US007349669B2

(12) United States Patent
Toyama

(10) Patent No.: US 7,349,669 B2
(45) Date of Patent: Mar. 25, 2008

(54) ELECTRONIC TOLL COLLECTION SYSTEM ADAPTED TO PLURAL TYPES OF PROTOCOLS EMPLOYED BY VARIOUS ON-VEHICLE UNITS

(75) Inventor: Kazumasa Toyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 393 days.

(21) Appl. No.: 10/304,002

(22) Filed: Nov. 26, 2002

(65) Prior Publication Data

US 2003/0109223 A1 Jun. 12, 2003

(30) Foreign Application Priority Data

Nov. 26, 2001 (JP) ............................ 2001-359463

(51) Int. Cl.

*H04B 7/00* (2006.01)
*H04B 1/06* (2006.01)
*H04B 1/034* (2006.01)
*G08G 1/00* (2006.01)

(52) U.S. Cl. ......................... 455/66.1; 455/96; 455/99; 455/344; 455/345; 455/575.9; 455/41.2; 455/3.06; 340/928

(58) Field of Classification Search ............... 455/66.1, 455/405, 406, 407, 41.2, 41.3, 408, 575.9, 455/95, 96, 97, 98, 99, 344, 345, 3.01–3.06; 340/905, 904, 928, 988

See application file for complete search history.

(56) References Cited

U.S. PATENT DOCUMENTS 6,493,562 B2 12/2002 Yoshida et al.

FOREIGN PATENT DOCUMENTS

| | | |
|---|---|---|
| CA | 2 307 361 | 11/2001 |
| JP | 8-212400 | 8/1996 |
| JP | A-H11-68650 | 9/1999 |
| JP | A-H11-288472 | 10/1999 |
| JP | A-2001-313976 | 11/2001 |
| WO | WO 00/77717 | 12/2000 |

OTHER PUBLICATIONS

Notification of Reasons for Rejection issued from Japanese Patent Office issued on Jan. 10, 2006 for the corresponding Japanese patent application No. 2001-359463 (a copy and English translation thereof).

*Primary Examiner*—Matthew Anderson
*Assistant Examiner*—Eugene Yun
(74) *Attorney, Agent, or Firm*—Posz Law Group, PLC

(57) ABSTRACT

An electronic toll collection (ETC) system comprises an on-vehicle unit mounted on a vehicle and a stationary-station communication system. This communication system operates to perform communication for accounting processing toward the on-vehicle unit mounted on the vehicle that passes a predetermined communication area. The stationary-station communication system comprises a controller and an antenna unit. The controller includes a protocol controller configured to produce a protocol selection signal and a communication controller configured to control the communication based on the produced communication protocol selection signal. The antenna unit includes a modem unit configured to selectively have a plurality of types of modulation/demodulation techniques corresponding to a plurality of types of protocols for the communication and control means configured to selectively allow the modem unit to be switched into a particular modulation/demodulation technique specified by the protocol selection signal.

5 Claims, 11 Drawing Sheets

| ITEMS | COMMUNICATION PROTOCOL 1 | COMMUNICATION PROTOCOL 2 |
|---|---|---|
| CARRIER FREQ. | 5.8 GHz | 5.8 GHz |
| COMMUNICATION SPEED | Downlink 500kbps | Downlink 1024kbps |
| | Uplink 250kbps | Uplink 1024kbps |
| COMMUNICATION SIGN | Downlink FMO | Downlink Manchester |
| | Uplink FMO | Uplink Manchester |
| ⋮ | ⋮ | ⋮ |

ELECTRONIC TOLL COLLECTION SYSTEM ADAPTED TO PLURAL TYPES OF PROTOCOLS EMPLOYED BY VARIOUS ON-VEHICLE UNITS

BACKGROUND OF THE INVENTION

1. Field of the Invention

The present invention relates to an electronic toll collection (ETC) system and a communication method for electronic toll collection, which enable the performance of accounting processing through communication with a system mounted on a vehicle that passes a predetermined communication area of a road.

2. Description of the Related Art

Recently, an electronic toll collection (ETC) system has gradually been increased at tollbooths of toll roads such as expressways. To collect a toll at a tollbooth, an on-road system is installed, while an on-vehicle unit is mounted on a user's vehicle, whereby performing radio communication between the on-road system and the on-vehicle unit. Through the radio communication, the processing for collecting a toll, such as withdrawing a toll from a user's account,previously registered, is automatically executed for the payment of the toll. This way of radio communication eliminates the necessity of stopping users' vehicles at tollbooths for toll payment, thus reducing traffic jams at or near tollbooths and reducing management cost by for example making tollbooths unmanned.

By the way, after such an electronic toll collection system is once introduced and on-vehicle units adapted to the system are supplied to users, there may arise the need for switching over to a system non-adapted to the on-vehicle units that have already been supplied to users. In such a case, replacing the already-equipped user's on-vehicle units with new units is necessary, but the replacement is time-consuming and costly, thus making a quick transition to the new system difficult.

As an example, the above situation may occur when a system employing a different communication protocol (or, simply "protocol") from the previous one is introduced. One solution to such a case is to install a plurality of types of on-road systems to be adaptable to a plurality of types of on-vehicle units. In this case, to perform communication with the on-vehicle units on the plurality of types of communication protocols, various types of on-road systems should be installed to cope with the on-vehicle units. However, this redundant system is far from its real installation in terms of both installation places and installation cost.

SUMMARY OF THE INVENTION

The present invention has been made to overcome the above problems. An object of the present invention is to provide an electronic toll collection system and a communication method for electronic toll collection, which are able to communicate with any type of protocol employed by an on-vehicle unit for collecting tolls, in cases where vehicles with different kinds of on-vehicle units operating on different communication protocols pass a communication area in which a toll gate is placed.

In order to achieve the foregoing object, as one aspect of the present invention, there is provided a stationary-station communication system for performing accounting processing through communication with an on-vehicle unit mounted on a vehicle passing a predetermined communication area. The system comprises a controller and an antenna unit. The controller includes a protocol controller configured to produce a protocol selection signal and a communication controller configured to control the communication based on the produced communication protocol selection signal. The antenna unit includes a modem unit configured to selectively have a plurality of types of modulation/demodulation techniques corresponding to a plurality of types of protocols for the communication and control means configured to selectively allow the modem unit to be switched into a particular modulation/demodulation technique specified by the protocol selection signal.

Thus, in response to the protocol selection signal from the protocol controller, the transmission and reception is controlled, and in the antenna unit, the modulation/demodulation techniques used in the modem unit is switched responsively to the protocol selection signal. That is, in accordance with a protocol specified by the protocol selection signal, communication processing including accounting processing is carried out between the communication system and an on-vehicle unit mounted on a vehicle passing a predetermined communication area. This makes it possible for the communication system to cope with various types of protocols in an easier and steadier manner, because communication on each protocol is allowed during each period of time given by the protocol selection signal.

As a result, even when there are different on-vehicle units operating on different types of protocols in a predetermined range of communication, the communication toward each on-vehicle unit can be done steadily. Hence, unlike the conventional, parallel arrangement of a plurality of communication systems becomes unnecessary, saving costs for construction, management and others and occupying as less space as possible. Further, for introducing on-vehicle units operating on a new type of communication protocol, it is enough that a modem circuit for the new protocol is simply added, thereby providing an easy and less-cost expansion for the communication system, thereby making the installation of the stationary-station communication system easier.

Preferably, the modem unit is provided with a plurality of modem circuits operating on the plurality of types of protocols, respectively. Hence, when it is desired that one or more new protocols be added or removed, only adding or removing one or more modem circuits operating on desired one or more types of protocols is sufficient. That is, the expansion and/or update of the system can be done with ease and less cost. In addition, the system according to the present invention is very flexible to changes in specifications of protocols that have been employed already.

It is also preferred that the protocol controller is configured to produce the protocol selection signal that allows the plurality of types of protocols to be selected by turns every period of time during which at least one time of communication processing is performed with the on-vehicle unit. Hence it is possible to perform the communication processing in a secure manner.

Still, it is preferred that the protocol controller is configured to produce the protocol selection signal for one time of the communication processing correspondingly to the plurality of types of protocols to be handled in one slot and the control means of the antenna unit is configured to perform the accounting processing through the communication processing over a plurality of slots when receiving a response from the on-vehicle unit that is present in the communication area.

Also preferred is that the protocol controller is configured to have means for determining the type of protocol of the on-vehicle unit mounted on the vehicle that is present in the communication area, means for producing the protocol selection signal corresponding to the determined protocol type continuously until the communication processing for the on-vehicle unit is completed, and means for producing the protocol selection signal for the next protocol type.

Preferably, the protocol controller is configured to have means for producing the protocol selection signal for one time of the communication processing correspondingly to the plurality of types of protocols to be handled in one slot, means for determining whether or not a response has been received during the slot from the on-vehicle unit that is present in the communication area, and means for repeatedly producing, in cases where the response has been received, the same protocol selection signal that enables the communication processing to be performed on the protocol of the on-vehicle unit that responded, until the communication processing is completed.

Still preferably, the protocol controller is configured to have means for repeatedly producing, in cases where the response received is composed of two or more responses, the same protocol selection signal that enables the communication processing to be performed on the two protocols of the two on-vehicle units that responded, until the communication processing is completed for the two on-vehicle units.

The foregoing object also can be achieved by an electronic toll collection system and a communication method for electronically collecting a toll, which are provided by the present invention as further aspects thereof, which are able to provide the identical operations and advantages to the above.

DETAILED EXPLANATION OF PREFERRED EMBODIMENTS

Figure 1:
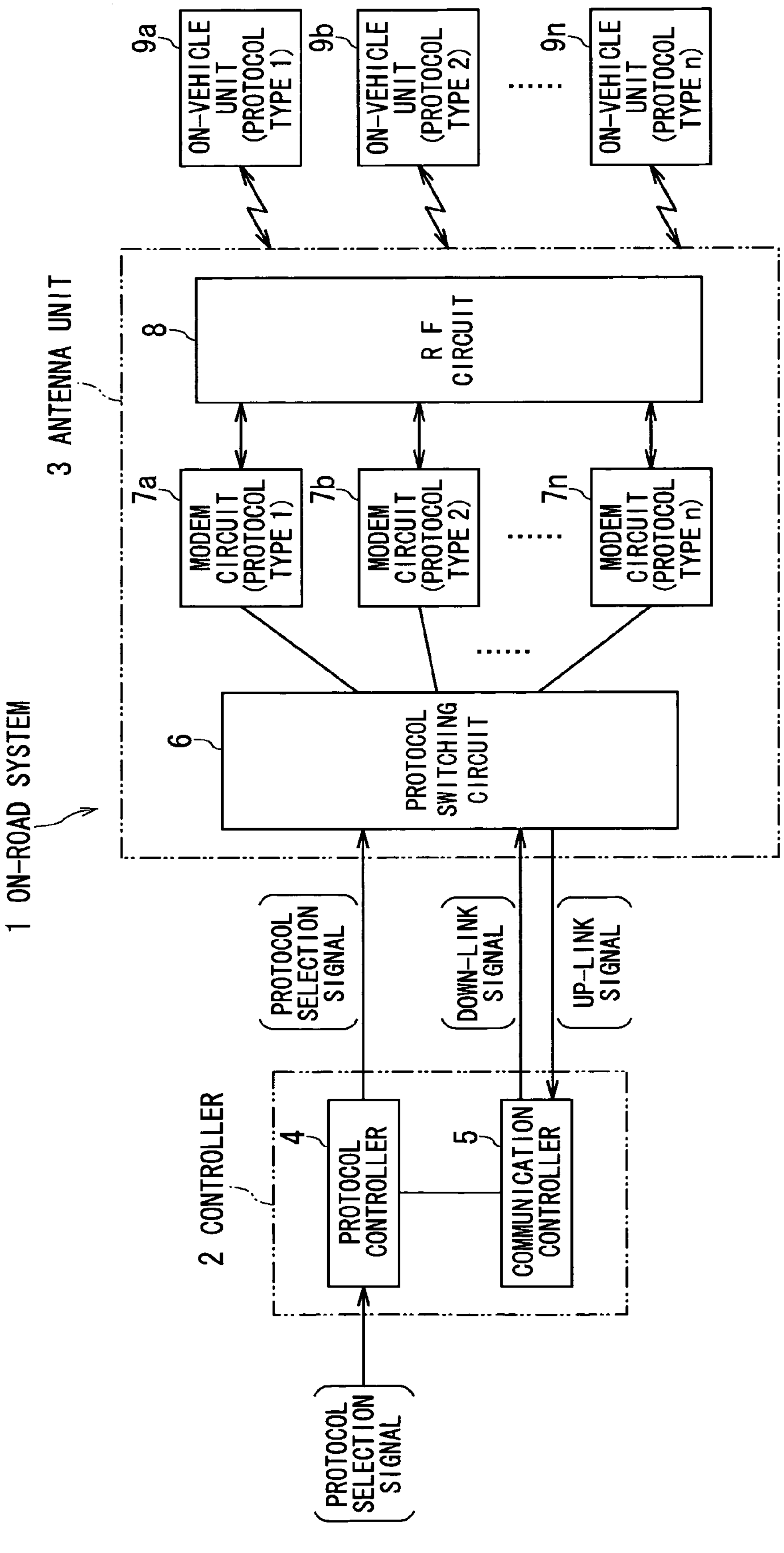
FIG. 1 is an electric block diagram outlining the configuration of a stationary-station communication system serving as an on-road system according to the present invention.

Referring now to the drawings, exemplary embodiments of the present invention will be described.

First Embodiment

Referring to FIGS. 1 to 6, a first embodiment of an electronic toll collection (ETC) system according to the present invention, which is installed at tollgates of an expressway, will now be described.

FIG. 1 shows an outlined electronic configuration of each on-road system 1 serving as a stationary-station communication system, which is a main constituent of the ETC system. Each on-road system 1 is equipped with a controller 2 that functions as a communication controller for controlling communication and an antenna unit 3 placed in a gantry bridged over the lanes at a tollgate.

The controller 2 is provided with a protocol controller 4 and a communication controller 5. The protocol controller 4 receives a protocol selection signal from constituents such as external control means for controlling the plural on-road systems arranged at the tollgate. Using this protocol selection signal, the protocol controller 4 produces a communication-protocol selection signal to output it to the antenna unit 3. The protocol controller 4 is also in charge of controlling the transmission and reception carried out by the communication controller 5. The communication controller 5 performs processing necessary for the transmission and reception of a down-link signals and an up-link signal to and from the antenna unit 3.

The antenna unit 3 is provided with a protocol switching circuit 6, a plurality of modem circuits 7*a*, 7*b*, . . . , 7*n*, and an RF circuit 8 so that the unit 3 is able to communicate by means of radio waves with on-vehicle units 9*a*, 9*b*, . . . , 9*n* that are currently present in a predetermined communication area in which the tollgate is located. The protocol switching circuit 6 receives the communication-protocol selection signal from the protocol controller 4 so as to connect the communication controller 5 to any one of the plural modem circuits 7*a*, 7*b*, . . . , 7*n* of which types of communication protocols 1, 2, . . . , n are different from each other. Each of the communication protocols 1, 2, . . . , n allows each of the modem circuits 7*a*, 7*b*, . . . , 7*n* to communicate via the RF circuit 8 with each of the on-vehicle units 9*a*, 9*b*, . . . , 9*n* of which communication protocol types 1, 2, . . . , n are also different from each other.

That is, the communication protocol of type "1" is installed in both the modem circuit 7*a* and the on-vehicle unit 9*a*, whereby enabling communication between the circuit 7*a* and unit 9*a*. The communication protocol of type "2" is installed in both the modem circuit 7*b* and the on-vehicle unit 9*b*, whereby enabling communication between the circuit 7*b* and unit 9*b*. In the same way, the modem circuits 7*c* to 7*n* are able to communicate with the on-road units 9*c* to 9*n*, respectively.

Referring to FIGS. 2 to 6, the operations of the above configuration will now be explained.

First, the basic operation of each on-road system 1 will now be explained with reference to a flowchart shown in FIG. 2 carried out by the communication controller 5.

Figure 2:
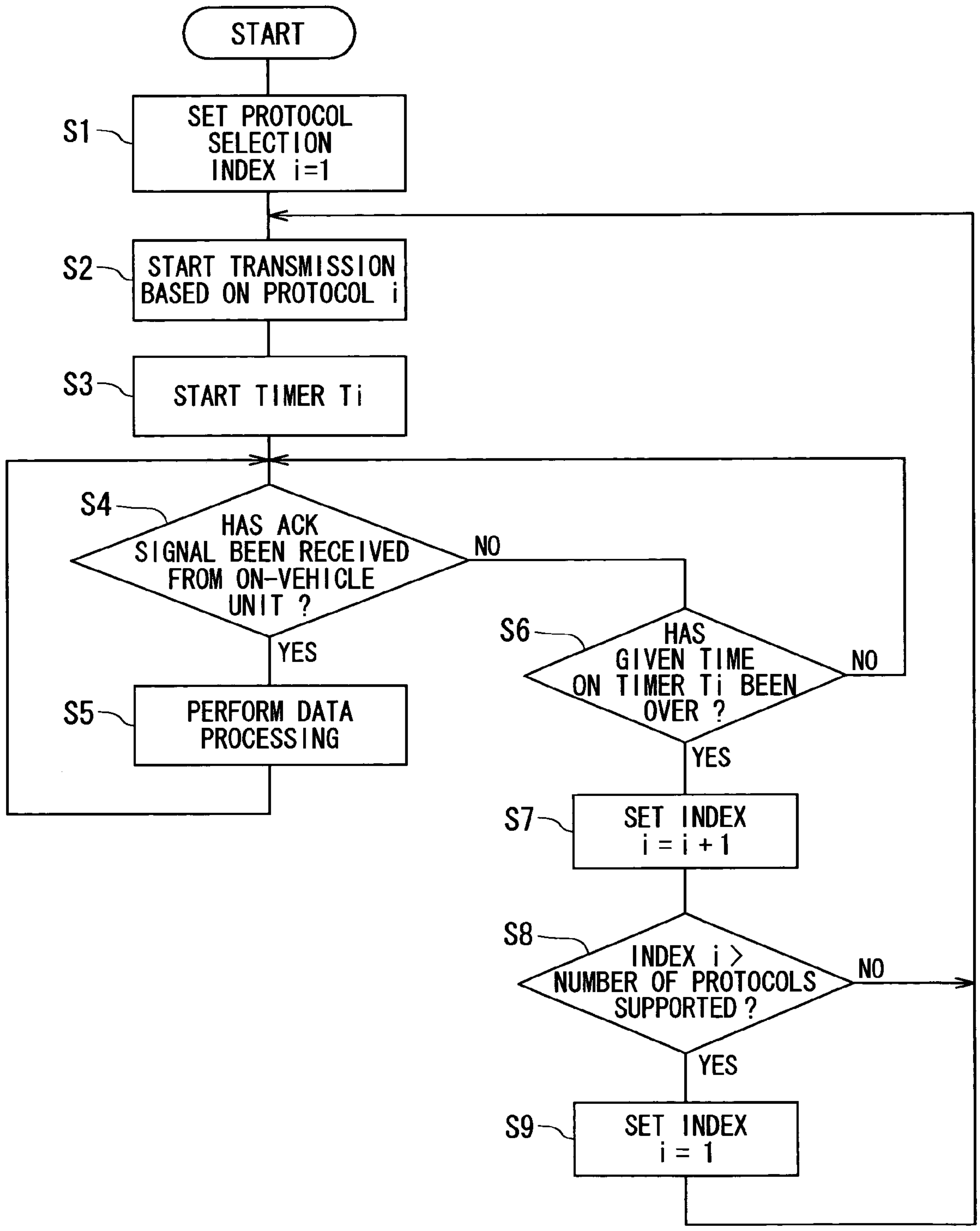
FIG. 2 is a flowchart showing the basic operation of the on-road system according to the first embodiment.

In each on-road system 1, responsively to receiving a protocol selection signal from an external controller, the controller 2 makes its protocol controller 4 assign "1" to a protocol selection index "i" and provides the index to the protocol switching circuit 6 of the antenna unit 3 (FIG. 2, step S1).

Figures 5, 6:
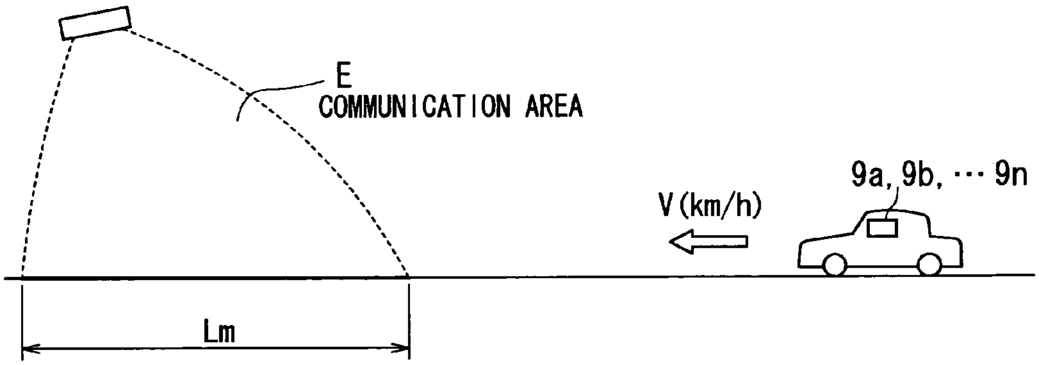
FIG. 5 illustrates the relationship among an on-vehicle unit, an on-road system, and a predetermined communication area in which the on-road system is able to communicate with the on-vehicle unit.
FIG. 6 is a table illustrating practical specifications of various types of communication protocols (or, simply "protocols")

Thus, the protocol switching circuit 6 activates the modem circuit 7*a* of which protocol type is "1," so that communication based on the communication protocol type "1" is possible via the RF circuit 8 in the communication area E (refer to FIG. 5). The communication controller 5 then proceeds to the next step, where the controller 5 transmits an enquiry signal toward the communication are E based on the communication protocol of which type is "1" (step S2). The communication controller 5 makes a timer Ti to count up a time T1, which is set as a duration during which one time of transmission and reception is done under the currently allowed one or more communication protocols (step S3).

If the on-vehicle unit 9*a* of which communication protocol is type "1" is present in the communication area E during a period of time in which the above enquiry signal is transmitted, the on-vehicle unit 9*a* responds by sending back an acknowledge signal (ACK). That is, the communication controller 5 is able to receive the acknowledge signal from the on-vehicle unit 9*a* and process the received data (steps S4 and S5). In contrast, if there is no vehicle with the on-vehicle unit 9*a* in the communication area E, the processing is moved to step S6, where it is determined whether or not the count of the timer Ti is over the predetermined amount T1. Thus, when no vehicle equipped with the on-vehicle unit 9*a* is detected, the processing at steps S4 and S6 is repeated until the count of the timer Ti reaches the predetermined amount T1. During the repetition, if the determination at step S6 becomes "YES" (i.e., the time T1 is over), the communication controller 5 moves to step S7 to count up the protocol selection index "i" by one (i=i+1).

The communication controller 5 then determines if the value of protocol selection index "i" is larger than the number of communication protocols supported by the on-road system 1 (step S8). In the present embodiment, the number of communication protocols is "n." When the determination of "NO" comes out at step S8, the counted-up index "i" is used to repeat the processing shown after step S1. This way of processing enables communication processing based on each of the communication protocol types 1 to n, which are assigned to the on-vehicle units 9*a* to 9*n* to be communicated.

When the communication processing based on all the communication protocol types 1 to n is completed as stated above, the determination at step S8 becomes "YES." This means that one slot for the processing is finished. Hence, the communication controller 5 returns the protocol selection index "i" to "1" to repeat the foregoing processing shown after step S1. The foregoing processing for the one slot is thus repeated to complete communication processing for a plurality of slots. Accordingly, this way of processing allows on-road system 1 to communicate with all the on-vehicle units 9*a* to 9*n* by turns, whereby being able to complete accounting processing for each vehicle.

Figure 3:
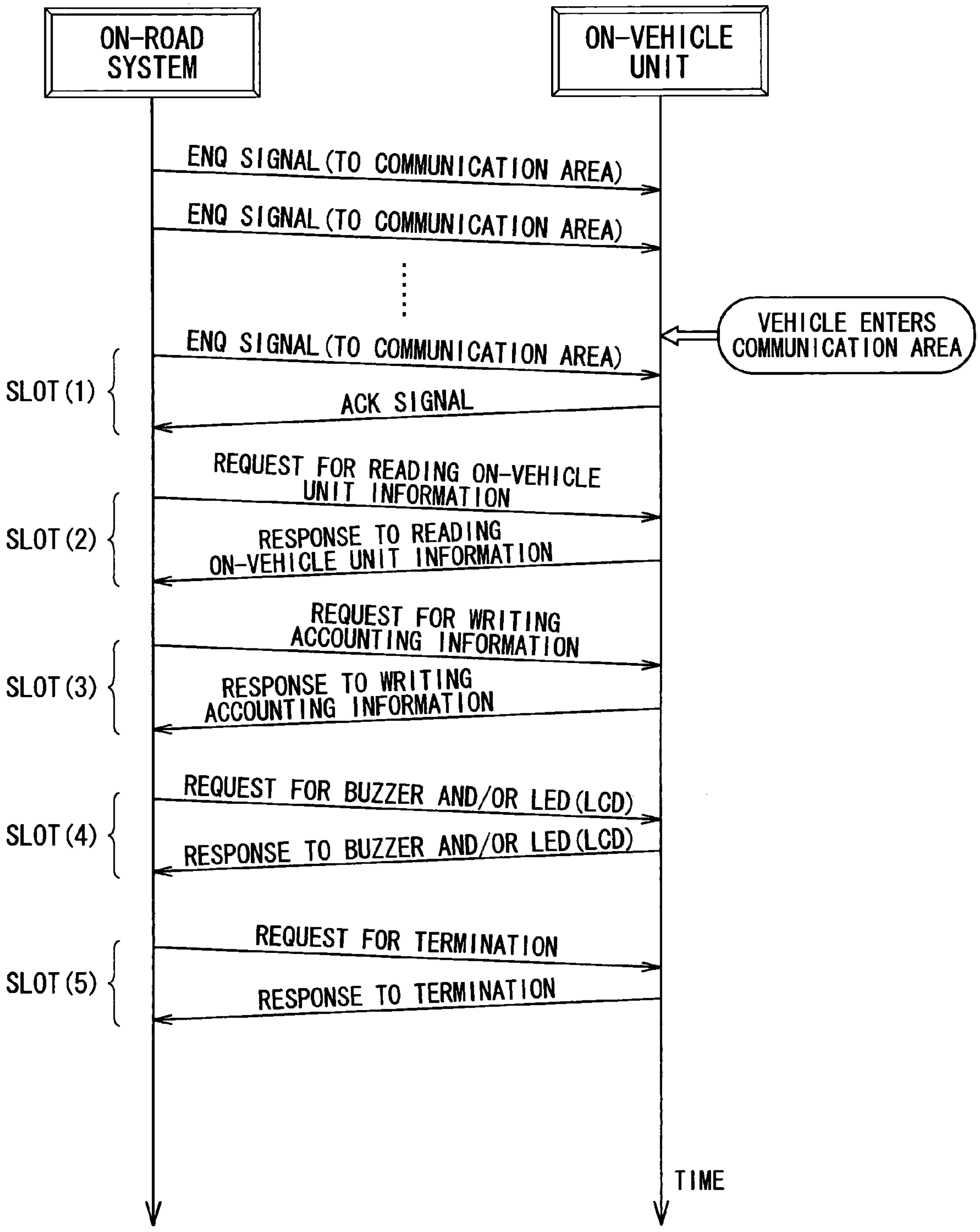
FIG. 3 is a sequence pictorially showing communication carried out between the on-road system and an on-vehicle unit in the first embodiment.

According to an example shown in this embodiment, one time of accounting processing is carried out through the performance of the communication processing for, for example, five slots. FIG. 3 exemplifies a sequence for communication processing carried out in each slot. With the protocol switching circuit 6 operated, the on-road system 1 transmits by turns an enquiry signal (ENQ) to each on-vehicle unit 9*a* (to 9*n*) that might be present in a commutation area E every communication protocol type.

When any vehicle equipped with any of the on-vehicle units 9*a* to 9*n* enters the communication area E, the unit 9*a* (9*b*, . . . , 9*n*) receives the acknowledge signal of any protocol type that has been transmitted as the above. The on-vehicle unit 9*a* (9*b*, . . . , 9*n*) responds by sending back an acknowledge signal, so that the first slot (1) is formed. The on-road system 1 that has received the enquiry signal then goes into the second slot (2) by transmitting a request signal for reading information about the on-vehicle unit 9*a* (9*b*, . . . , 9*n*) and receiving a response signal to read out the information about the on-vehicle unit 9*a* (9*b*, . . . , 9*n*), which has been sent therefrom.

In the succeeding the third slot (3), the on-road system 1 operates to transmit a request signal for writing accounting information to the on-vehicle unit 9*a* (9*b*, . . . , 9*n*). In response to this transmission, the on-vehicle unit 9*a* (9*b*, . . . , 9*n*) transmits back a response signal to write the accounting information to the on-road system 1. Then, in the fourth slot (4), to the on-vehicle unit 9*a* (9*b*, . . . , 9*n*), the on-road system 1 transmits a display request signal for informing communicated results by mans of display on LEDs, LCDs, and/or sounding a buzzer. The on-vehicle unit 9*a* (9*b*, . . . , 9*n*) receives the display request signal, and then sending back to the on-road system 1 a signal to respond to the display. After this, in the firth slot (5), the on-road system 1 transmits a request signal for terminating the communication to the on-vehicle unit 9*a* (9*b*, . . . , 9*n*), before the on-vehicle unit 9*a* (9*b*, . . . , 9*n*) returns a response signal for the termination to the on-road system 1. Accordingly, the communication processing is terminated, during which the accounting processing is accomplished.

The above communication processing will now be explained with a more practical mode shown in FIG. 4, in which exemplified is the on-vehicle unit 9*a*, whose communication protocol type is "1," which will enter the communication area E (refer to FIG. 5). In response to the protocol selection signal, every interval of time T1, T2, . . . , Tn counted by the foregoing timer Ti, the on-road system 1 has sequentially transmitted enquiry signals in accordance with each communication protocol of from "1" to "n" toward the communication area E.

When the vehicle having the on-vehicle unit 9*a* whose communication protocol type is "1" comes into the communication area E, the on-vehicle unit 9*a* transmits an acknowledge signal to the on-road system 1. Hence the on-road system 1 is able to receive the acknowledge signal and recognize the incoming vehicle. Under the processing carried out in the slot (1), as described before, both of the enquiry signal and the acknowledge signal are communicated between them as the communication processing. Hence the time T(1) consumed by the first slot is the sum of T1 to Tn. Hereafter, during a period of time of each of the second to fifth slots, the foregoing communication processing is carried out, whereby the accounting processing is executed. Each time T(2) (to T(5)) consumed by each of the second to fifth slots is the sum of T1 to Tn, which is the same as that for the first slot.

Types of communication protocols to be used for practical purposes will now be exemplified. FIG. 6 shows the specifications of two types of communication protocols to be used for communication processing. One communication protocol "1" is the same in carrier frequency as the other communication protocol "2," but different in a communication speed, communication codes, or others from the other communication protocol "2." Thus it is impossible for one antenna to handle two types of communication based on the protocols "1" and "2" simultaneously.

Thus, as described before, the two types of communication based on the two types of protocols "1" and "2" are processed in a time-sharing manner. As one example, the time T1 and T2, which is a period of time necessary for one time of communication processing based on each protocol, are set to 5 ms and 2.5 ms, respectively. These values of the time T1 and T2 are derived, as will described later, from the relationship among a communication speed, the length L [m] of a communication area E, and a maximum speed V [km/h] of a vehicle passing the communication area E.

If it is assumed that the length L of a communication area E is 3 m and the accounting processing is completed within 5 slots of communication processing, a maximum speed V of a vehicle passing the communication area E is allowed to be up to 288 [km/h], as follows.

$$[3(m)\times 3600(s)]/[(5(ms)+2.5(ms))\times 5(slots)]=288(km/h)$$

This means that even if a vehicle passes at a speed of 288 (km/h), the communication processing based on the 5 slots can be secured. The vehicle speed of 288 (km/h) is not practical and higher than ordinary practical speeds, which gives a surplus period of time that should be assigned to a retry of communication processing. When such a temporal scheme is adopted, a retry of communication processing for failure in the communication can be conducted. Thus, if a vehicle speed is for example 200 (km/h), it is possible to perform the communication processing in a total of 7.2 slots, so that the retry for the communication processing is given to 2 slots.

As a result, the present embodiment makes it possible that, when various vehicles having a plurality of types of the on-vehicle unit 9*a*, 9*b*, . . . , 9*n* whose communication protocols differ from each other are present simultaneously in the communication area, the communication processing can be conducted with each on-vehicle unit 9*a* (9*b*, . . . , 9*n*), thus allowing the accounting processing to be done with each vehicle in a secure manner. Practically, the protocol controller 4 outputs by turns a communication protocol selection signal based on a protocol selection signal that has been given. The communication protocol selection signal is sent to the antenna unit 3, where the signal drives the protocol switching circuit 6 so as to selectively switch a plurality of modem circuits 7*a* to 7*n* in a time-sharing fashion. Hence the plurality of modem circuits, which are given a plurality of communication protocols, can be in charge of communication processing sequentially. It is therefore unnecessary to have individual on-road systems for different communication protocols, while still performing the accounting processing securely with each of the on-vehicle units 9*a*, 9*b*, . . . , 9*n*.

Second Embodiment

Figure 7:
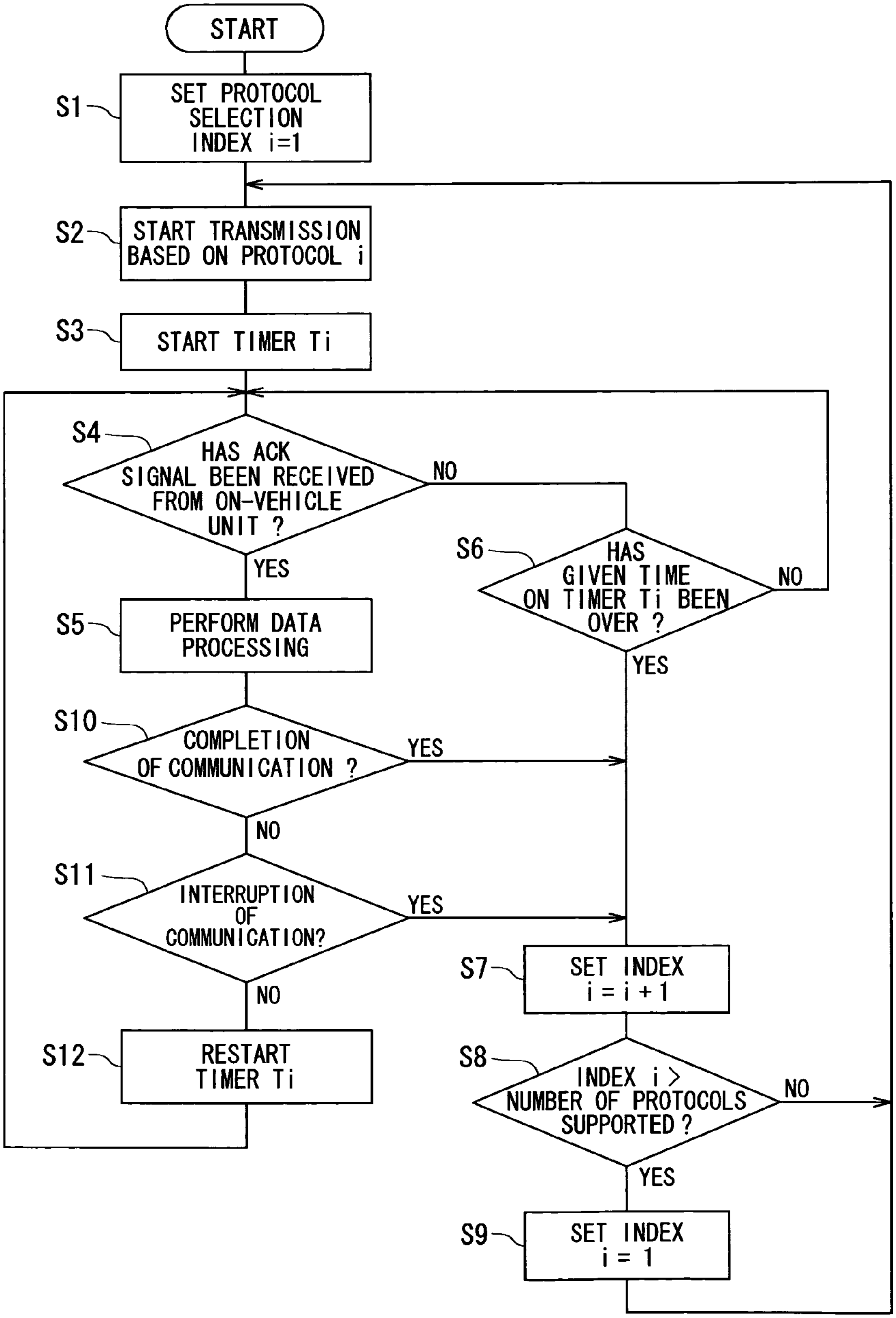
FIG. 7 is a flowchart showing the basic operation of the on-road system according to the second embodiment.
Figure 8:
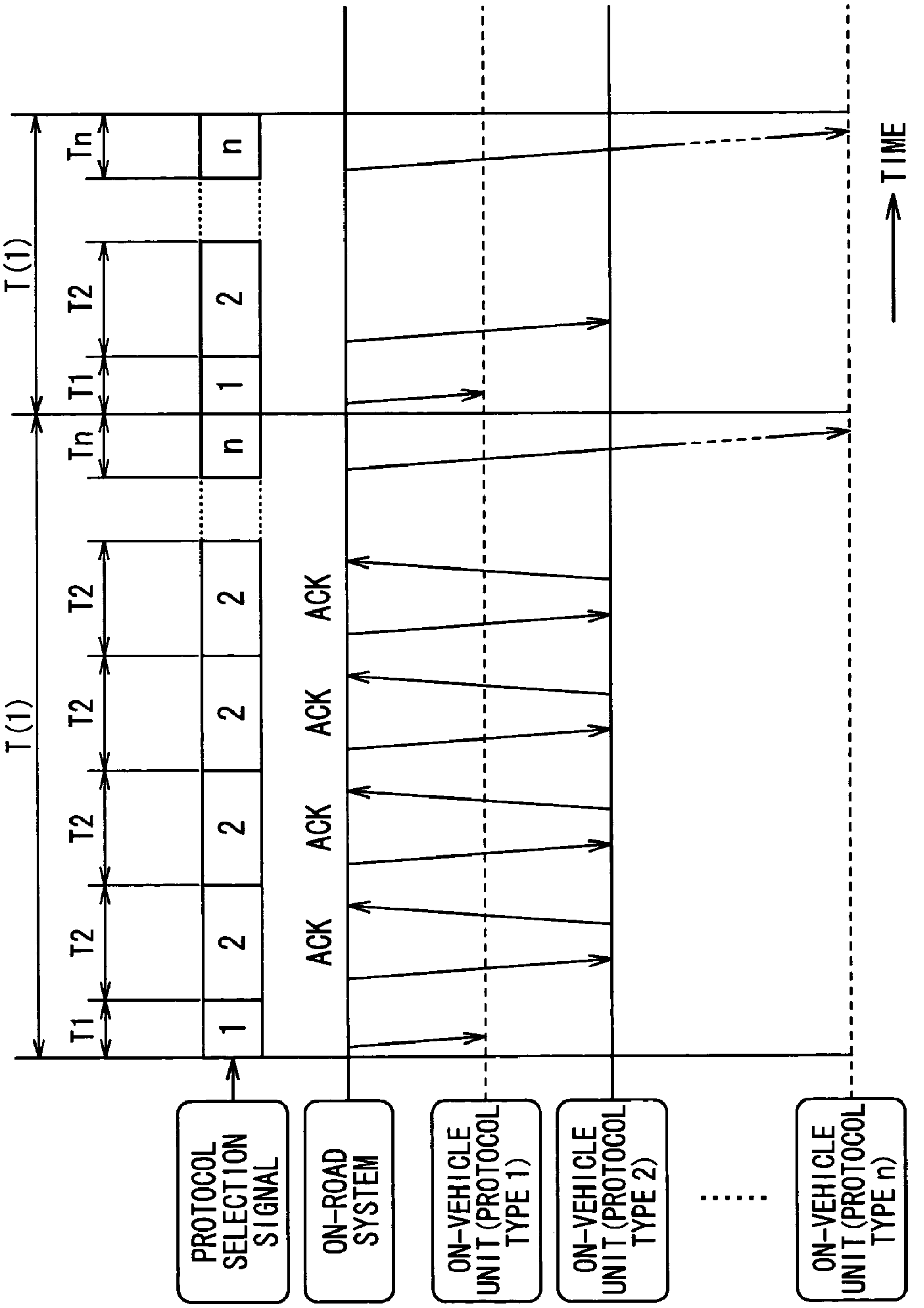
FIG. 8 is a timing chart exemplifying communication carried out between the on-road system and an on-vehicle unit in the second embodiment.

Referring to FIGS. 7 and 8, a second embodiment of the present invention will now be described.

The on-road system 1 according to the second embodiment is characteristic of continuously conducted communication processing if any on-vehicle unit responds. Namely, in the first embodiment, for each communication protocol, only a period of time T1 (to Tn) for one time of communication processing is assigned to the first slot, and the next communication processing on each communication protocol is forwarded to each slot in the second spot or a subsequent spot thereto. In contrast, in the second embodiment, if a response is gained from any on-vehicle unit, the communication processing on that protocol on which the responded on-vehicle operates can be continued without forwarding its processing to the next spot.

That is, as shown in FIG. 7, the controller 2 of the on-road system 1 performs the processing at step S1 to S5 which are the same as those in the first embodiment, thus being able to receive an acknowledge signal from any on-vehicle unit and process the data. The controller 2 determines if a series of steps of communication processing have been completed or not (step S10), before determining if the communication is interrupted or not (step S11). The determination at both the steps is "NO," the processing is made to go to step S12, where the timer Ti is restarted, and then the processing returns to step S4. This way of processing carried out by the controller 2 enables the communication processing on the protocol once detected to continue until the accounting processing is completed through a series of processing described before.

On completion of the communication processing with the detected on-vehicle unit (i.e., any acknowledge signal does not come any longer), it is determined if or not the count of the timer Ti reaches a predetermined value (step S6). When the determination is "YES" at step S6 (i.e., the predetermined time has passed), the processing is handed to step S7. Hereafter, the same processing as that in the first embodiment is carried out (steps S7 to S9), during which time, if the determination at step S8 is "YES," the communication processing for the one slot is ended, thus giving "1" to the protocol selection index "i." Thus, the controller 2 shifts its communication processing to the next slot.

Accordingly, the time necessary for the communication processing carried out during a single slot is not always constant, because if any on-vehicle unit 9*a* (9*b*, . . . , 9*n*) responds, the communication with the on-vehicle unit 9*a* (9*b*, . . . , 9*n*) will continue beyond a given period of time T1 (, . . . , Tn) until the completion of the communication processing. However, in cases where there is still a vehicle with any on-vehicle unit 9*a* (9*b*, . . . , 9*n*) that should be communicated with the on-road system 1 in the communication area E, the priority can be given to the on-vehicle unit 9*a* (9*b*, . . . , 9*n*) as concerning the order of performing the communication processing. Hence the communication processing is completed quickly with the on-vehicle unit 9*a* (9*b*, . . . , 9*n*) that has been detected. The periods of time for one-way communication based on various types of communication protocols can be reduced. Hence, this is therefore particularly advantageous if a large number of types of communication protocols are involved in the on-road system 1.

Figure 4:
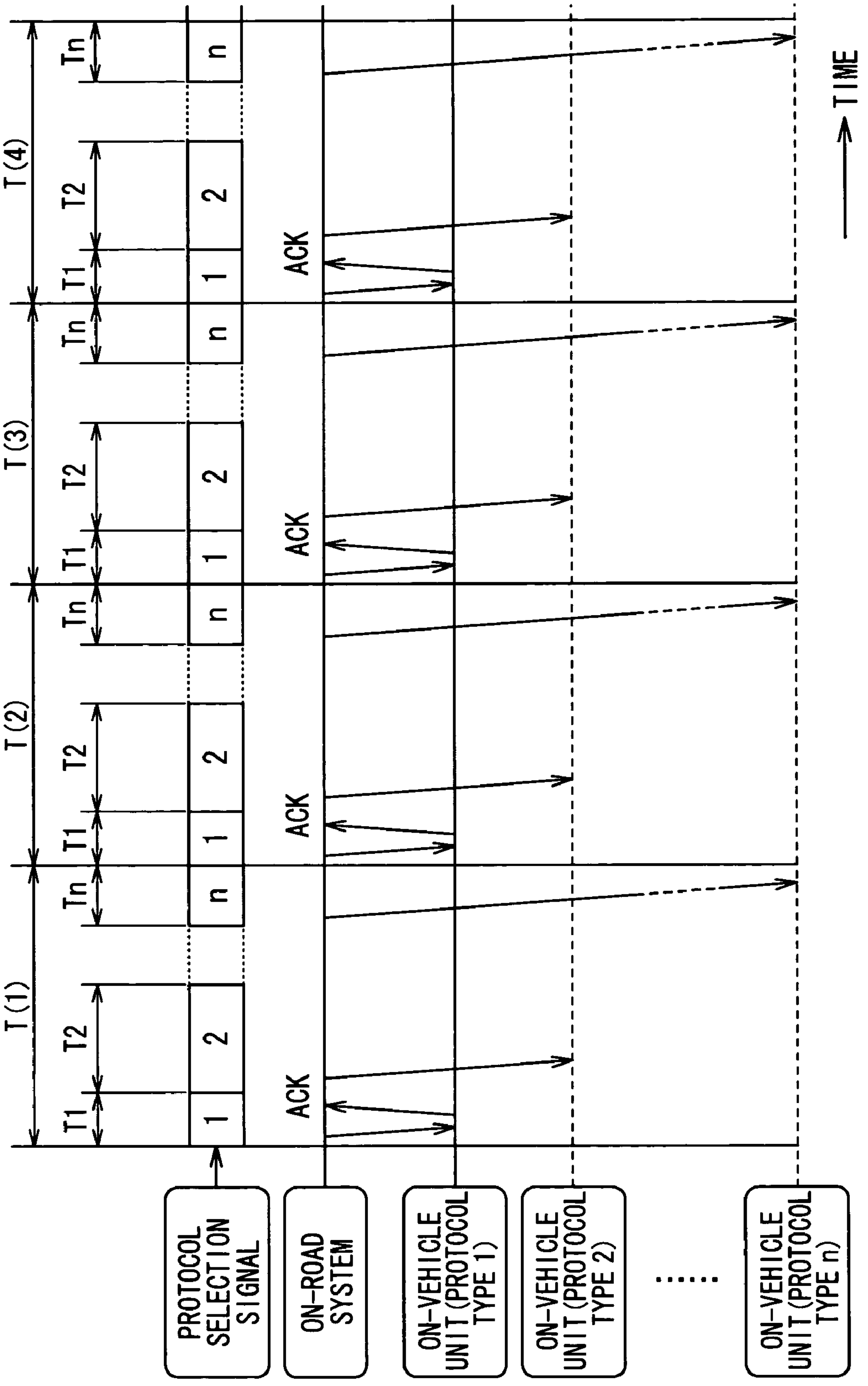
FIG. 4 is a timing chart exemplifying communication carried out between the on-road system and an on-vehicle unit in the first embodiment.

FIG. 8 exemplifies a timing chart similar to that in FIG. 4, in which the on-vehicle unit 9*b* whose communication protocol type is "2" responds by sending back the acknowledge signal to the on-road system 1. This timing chart shows that, as the on-road system 1 transmits enquiry signals toward the communication area E every period of time T1 to Tn counted by the timer Ti correspondingly to each communication protocol type, the on-road system 1 is in search for any vehicle by detecting a reply signal. When the vehicle on which the on-vehicle unit 9*b* is mounted enters the communication area E, the unit 9*b* sends back its reply signal to the on-road system 1, so that the on-road system 1 keeps performing communication processing with the on-vehicle unit 9*b* on the communication protocol type "2."

The communication processing between the on-road system 1 and the on-vehicle unit 9*b* is executed in the similar manner to a series of steps shown in FIG. 3. After completing such processing, the on-road system 1 shifts its processing to the next one based on the next communication protocol type. This processing is repeated for every protocol type. Finishing the communication processing based on the last protocol type "n" becomes the finish of processing for a single slot. Since the on-vehicle unit 9*b* has already been subjected to the accounting processing, the processing for the next vehicle that has entered the communication area E can be done through the next slot or subsequent slots thereto.

As described above, in the second embodiment, the time for each communication slot is not fixed but changeable. That is, when receiving from any vehicle having any on-vehicle unit, the on-road system 1 continuously performs, until its end, the communication processing on the protocol employed by the responded on-vehicle unit. Accordingly, the communication processing toward an on-vehicle unit that is present in the communication area can be done quickly and steadily.

The communication technique in the second embodiment has a particular advantage of being able to cope with a large number of types of communication protocols. In other words, the time necessary for communication processing based on protocol types that have not currently been engaged in communication can be removed as being waste. It is therefore possible to execute the communication processing including the accounting processing in a quicker and steadier manner.

Third Embodiment

Referring to FIGS. 9 to 12, a third embodiment will now be described. The third embodiment also features a continuation of communication processing, once any vehicle that has an on-vehicle unit has responded.

More practically, in the foregoing second embodiment, when any on-vehicle unit responds in the first communication slot, the unit can continue communicating with the on-road system 1 on the self communication protocol. The third embodiment differs in that, if receiving a reply from any on-board unit in the first slot, the on-road system 1 tries to receive a reply from the on-board unit in the second slot or subsequent slots thereto, and continuously performs communication processing with the responded on-board unit.

Figure 9:
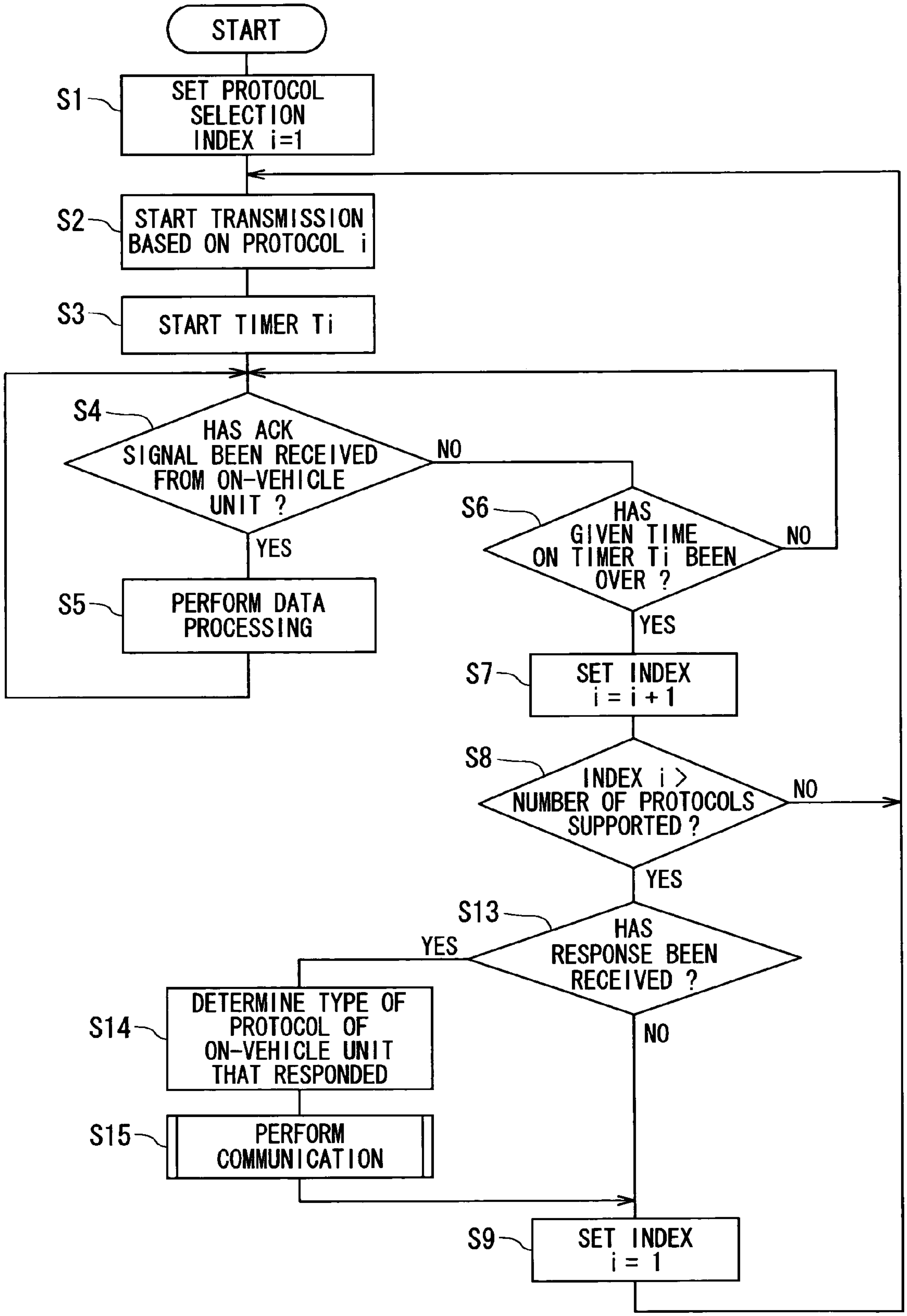
FIG. 9 is a flowchart showing the basic operation of the on-road system according to the third embodiment.
Figure 10:
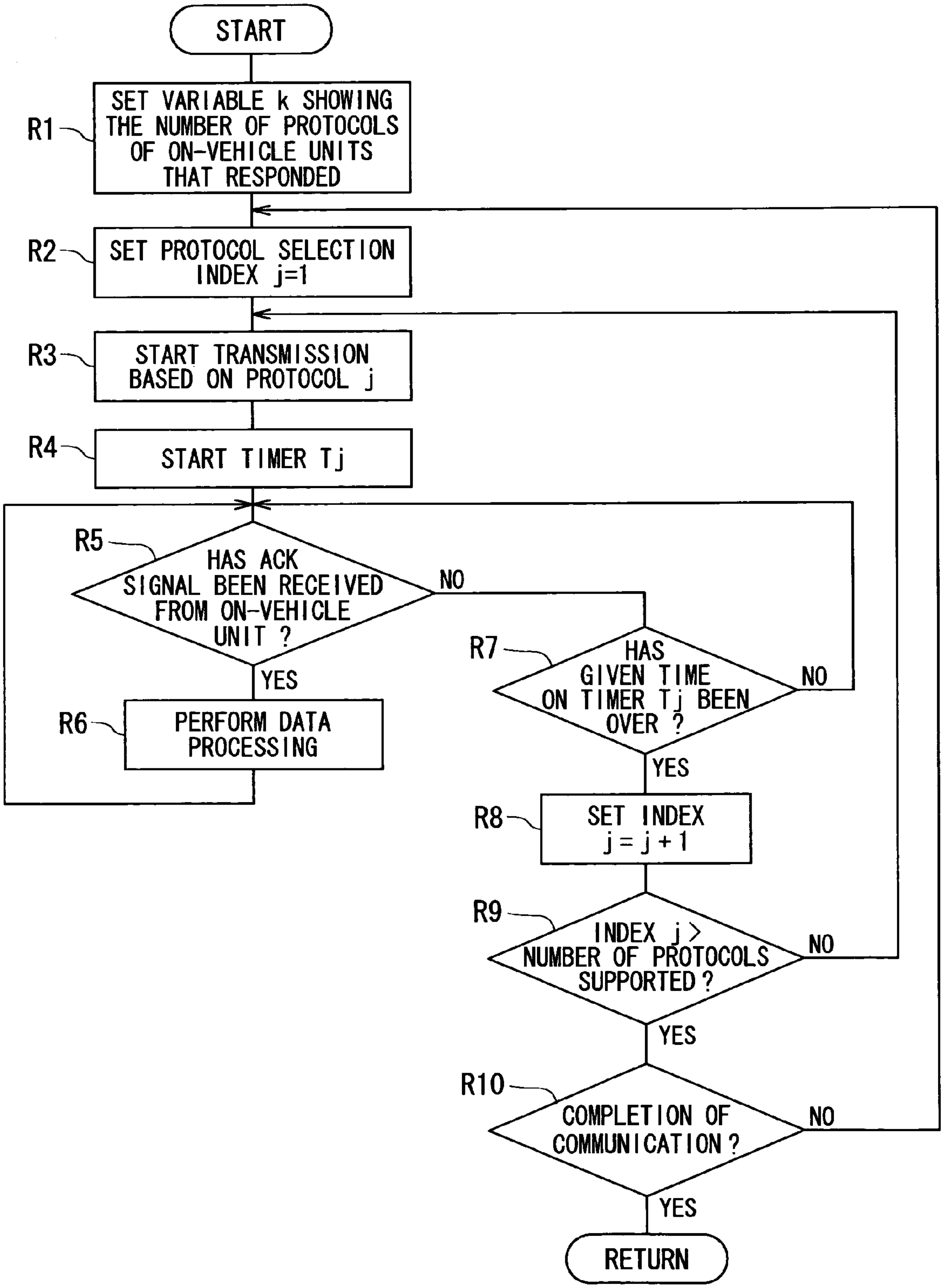
FIG. 10 is a subroutine carried out by with an on-vehicle unit that responded to an enquiry from the on-road system.

FIGS. 9 and 10 show the procedures required for such communication processing. Steps S1 to S8 in the procedures shown therein are the same as those in FIG. 2, which are carried out by the on-road system 1. When the communication processing in the first slot is completed (YES at step S8), the processing proceeds to step S13, where it is determined if or not there is any on-vehicle unit 9*a* (to 9*n*) that has responded in the first slot.

If the determination at step S13 becomes YES, the on-road system 1 then decides a communication protocol type on which the on-vehicle unit 9*a* (to 9*n*) that has responded operates (step S14). Therefore the on-road system 1 makes its processing go to step S15, where the communication processing based on the decided protocol is carried out. Carrying out the communication processing at step S15 makes it possible that only the on-vehicle unit 9*a* (to 9*n*) that has responded is allowed to communicate repeatedly, during which time the accounting processing is also carried out. After the communication processing in this first slot, the processing is made to proceed to step S9 to return the index "i" to "i=1," with the result that the processing is returned to step S2 to perform the communication processing in the next communication slot.

The communication processing conducted as a subroutine at step S15 will now be detailed with reference to FIG. 10. In this subroutine processing, the on-road system 1 sets a variable "k" showing the number of types of communication protocols on which the on-vehicle units 9*a*, 9*b*, . . . 9*n* responded and counts up the number using the variable "k" (step R1). Then, as to the communication protocol type counted at first (i.e., k=1), the on-road system 1 assigns an initial value "1" to a protocol selection index "j" (step R2), and starts to transmit signals indicative of the communication processing toward the communication area E based on the assigned protocol (corresponding to j=1) (step R3). A timer Tj is also started (step R4).

The on-road system 1 receives data and process it, if any on-vehicle unit 9*a* (9*b*, . . . , 9*n*) operating on the currently selected communication protocol responds (steps R5 and R6). While repeating the data processing from the on-vehicle unit 9*a* (9*b*, . . . , 9*n*) that responded, the on-road system 1 determines the result "YES" at step R7 when the count of the timer Tj reaches a given value. Then the protocol selection index "j" is counted up by one (step R8). If the value of the index "j" is not over the value of the variable "k" counted up at step R1, the on-road system 1 returns its processing to step R3 for the communication processing on the next type of communication protocol (step R9).

As described above, the on-road system 1 is able to communicate with all of one or more on-vehicle units 9*a* (9*b*, . . . , 9*n*) that responded in the first slot. In cases where such communication has been completed one time for each on-vehicle unit 9*a* (9*b*, . . . , 9*n*) that responded in the first slot, the determination at step R9 becomes "YES." Thus, the on-road system 1 proceeds to step R10, whereat it is decided whether or not all the communication processing has ended. Normally, the accounting processing can be ended within some 5 slots of communication processing, at the maximum, up to some 7 slots including slots for retries. Thus, if the determination is "NO" at step R10, the processing is returned to step R2 to reset the index j to j=1, before repeating the foregoing steps R2 to R8. On completion of the communication processing toward all the on-vehicle units 9*a* (9*b*, . . . , 9*n*) that responded in the first slot through the above repeated processing, the determination at step R10 becomes "YES," thus being returned to step S9 of the main program shown in FIG. 9.

Figure 11:
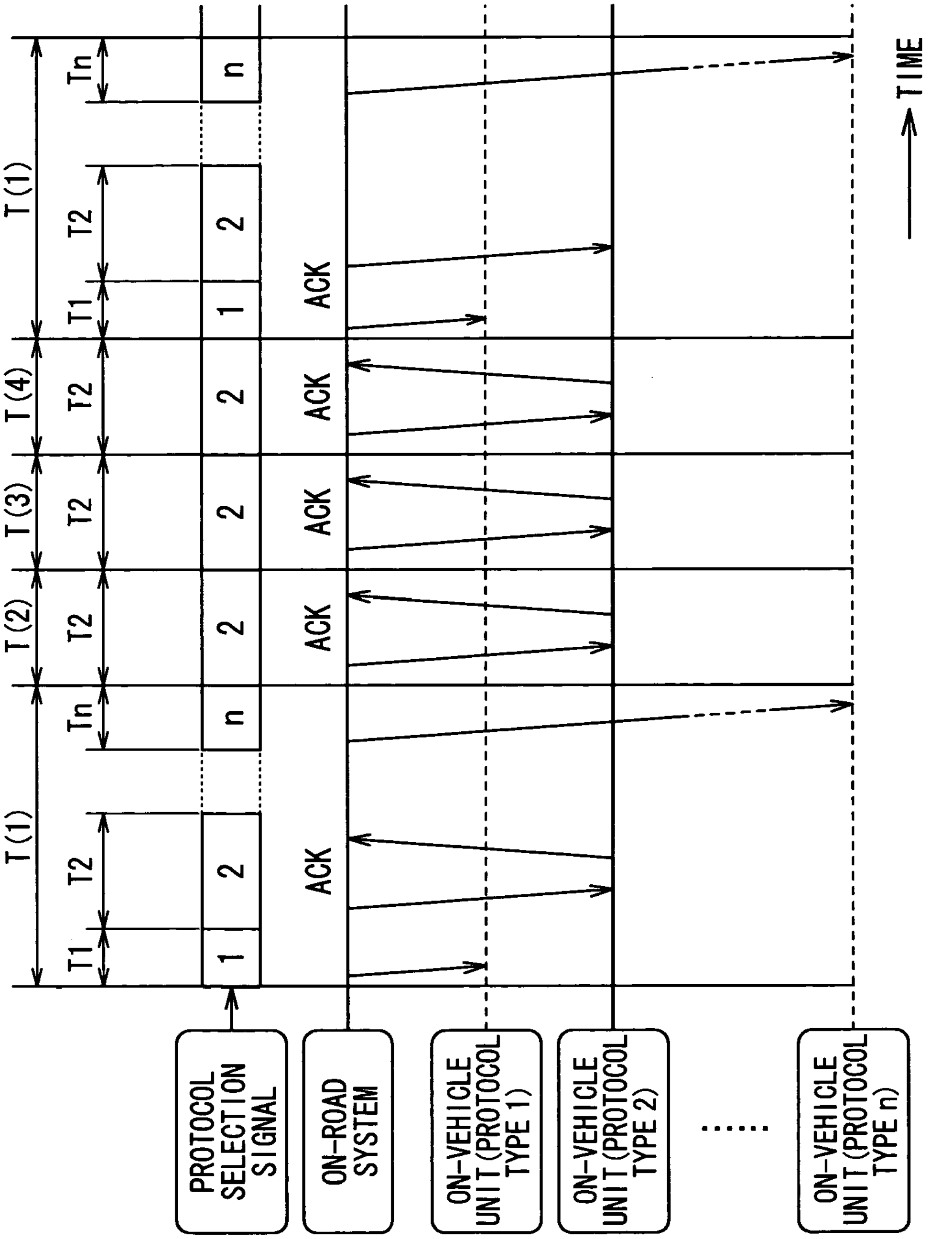
FIG. 11 is a timing chart exemplifying communication carried out between the on-road system and a single on-vehicle unit that responded in the third embodiment.
Figure 12:
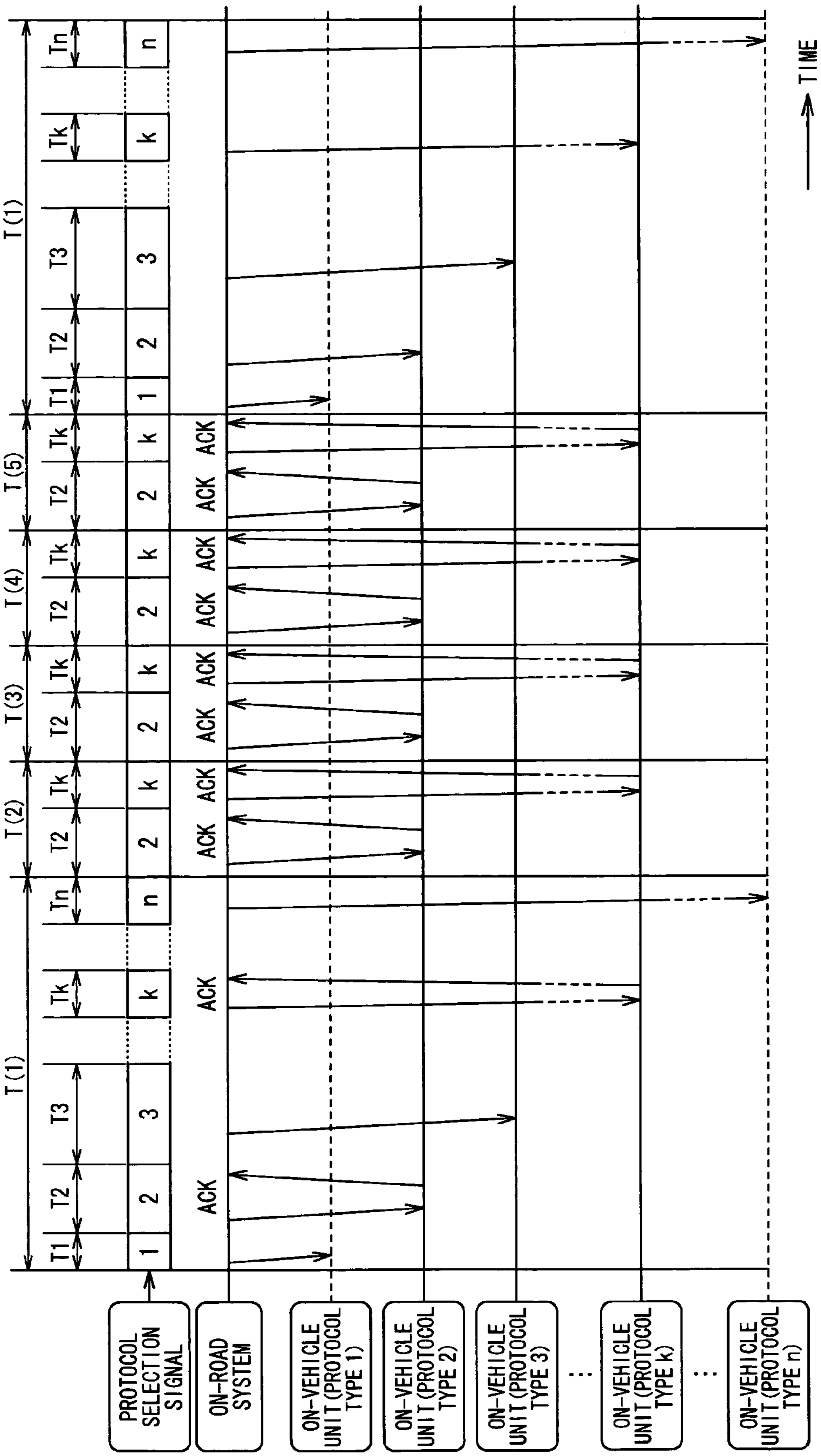
FIG. 12 is a timing chart exemplifying communication carried out between the on-road system and plural on-vehicle units that responded in the third embodiment.

The communication processing based on the above procedures will now be exemplified with reference to FIGS. 11 and 12. Such exemplification will be given at two cases (a) and (b) depending on the length L of a communication area E (refer to FIG. 5). The first case (a) provides the communication area E that allows only one on-vehicle unit to be present therein, whilst the second case (b) provides the communication area E allows two or more on-vehicle units to be present therein at the same time.

First Case (a)

The first case (a) is shown in FIG. 11, which shows that a vehicle equipped with the on-vehicle unit 9*b* operating on the communication protocol type "2" solely passes the communication area E. In the first communication slot T(1), the on-road system 1 transmits en enquiry signal toward the communication area E, while the on-vehicle unit 9*b* answers the enquiry by sending back an acknowledge signal. On completing the processing in the first slot (1), the on-road system 1 finds at step S14 in FIG. 9 that the on-vehicle unit 9*b* operating on the communication protocol type "2" has responded. Responsively to this detection, the on-road system 1 will proceed to the processing shown in FIG. 10, wherein the communication processing is performed based on the communication protocol type "2."

The example shown in FIG. 11 represents three times of communication processing carried out through the second slot T(2) to the fourth slot T(4), during which periods of time the accounting processing is completed. After the accounting processing, the on-road system 1 returns to the first slot T(1) to perform the communication processing, so that the system 1 is ready for the communication with the next single on-vehicle unit equipped on a vehicle which will come into the communication area E.

In the communication processing S15 in FIG. 9 (that is, at steps R1 to F10 in FIG. 10), as stated before, the variable "k" (=1; the number of protocol types detected is one; that is, only the type "2") and the protocol selection index "j" are both set. And the timer Tj=T2 for only the one detected protocol type "2" is made to restart repeatedly until the accounting processing is completed.

Second Case (b)

The second case (b) is shown in FIG. 12, which shows that two vehicles equipped with the on-vehicle units 9*b* and 9*k* operating on the communication protocol type "2" and "k" respectively pass the communication area E. In the first communication slot T(1), the on-road system 1 transmits enquiry signals about all the protocols "1 to n" toward the communication area E. Responsively to such enquiries, each of the on-vehicle units 9*b* and 9*k* answers by sending an acknowledge signal back. On completing the processing in the first slot (1), the on-road system 1 finds at step S14 in FIG. 9 that the two on-vehicle units 9*b* and 9*k* respectively operating on the communication protocol type "2" and "k" have responded. Responsively to this detection, the on-road system 1 will proceed to the processing in the second and subsequent slots T(2) to T(5) shown in FIG. 12, wherein the communication processing is repeatedly performed based on only the communication protocol types "2" and "k." During the second to fifth slots T(2) to T(5), the accounting processing for the two vehicles is completed. The system 1 is then ready for the communication with the next two on-vehicle units equipped on two vehicles that will come into the communication area E.

Accordingly, in addition to the identical or similar advantages to those obtained by the second embodiment, the ETC system according to the third embodiment is able to present additional advantages. In other words, even if there are concurrently a plurality of on-vehicle units in an communication area, the on-road system 1 is able to communicate with the plurality of on-vehicle units in a quicker and more efficient manner. Such communication can be achieved even when different types of protocols are included into the protocols of the on-road system 1, so that the accounting processing is also executed without fail.

Modifications

The ETC system according to the present invention is not restricted to the above-described configurations, but can be modified or developed in other various forms.

For example, the protocol selection signal given to the controller 2 may be self-generated by the controller 2 itself, not limited to the foregoing configuration where such signal is supplied from external control means. Still, to handle a plurality of vehicles equipped with a plurality of on-vehicle units whose protocol types are the same are present in a communication area at the same time, the ETC system according to the present invention can be modified such that each communication slot is set to a period of time enough for a plurality of times of communication with those units, thus enabling the communication processing to be performed with each on-vehicle unit.

Further, the timers Ti and Tj have been exemplified about their configurations in which each of their predetermined counts is set to a value corresponding to a period of time necessary for one time of communication processing, but this is not a definite list. A predetermined count of each of the timers Ti and Tj can be set to a value corresponding to a period of time that allows a plurality of times of communication processing. Moreover, a predetermined count of each of the timers Ti and Tj may be given as a proper value depending on types of protocols. More practically, such predetermined count may be decided in consideration of the length L (m) of a communication area E, an upper limit V (km/h) of speeds of vehicles passing the communication area, the communication speed of a protocol to be employed, and others.

Further, the present invention can be directed to various other applications other than the accounting processing, as long as communication is made based on a plurality of different protocols. Such application includes management of parking lots, management of electronic license plates, and investigation of traffic volume.

What is claimed is:

1. A stationary-station communication system for performing communication with a plurality of on-vehicle units mounted on a plurality of vehicles each passing through a predetermined communication area, each on-vehicle unit operating on one of a plurality of types of protocols for the communication, the communication being directed to predetermined processing, the system comprising:

an antenna unit including i) a modem unit configured to selectively perform a plurality of types of modulation/demodulation techniques respectively based on the plurality of types of protocols for the communication with each of the on-vehicle units, and ii) control means configured to allow the modem unit to perform, of the plurality of types of modulation/demodulation techniques, a specified modulation/demodulation technique based on, of the plurality of types of protocols, a protocol selectively specified by a protocol selection signal so that the antenna unit performs the communication with each of the on-vehicle units based on the specified protocol, when each of the plurality of vehicles is within the communication area, and a protocol controller comprising:

first producing means for producing the protocol selection signal to cause the modem unit to cycle through the plurality of types of protocols over a predetermined period of time in at least one slot of the communication, such that the communication is performed in turn with a plurality of on-vehicle units, determining means for determining two or more types of protocols employed by two or more of the plurality of on-vehicle units when two or more responses are received from the two or more of the plurality of on-vehicle units in response to the protocol selection signal produced by the first producing means, and second producing means for producing the protocol selection signal to specify use of each of the two or more types of determined protocols in one or more time-division slots following the slot in which the determining means determines the two or more types of protocols, the second producing means producing the protocol selection signal until the predetermined processing for the two or more on-vehicle units that employ the determined two or more protocols are completed, respectively, the protocol selection signal produced by the second producing means enabling the control means of the antenna unit to perform the predetermined processing.

2. The stationary-station communication system of claim 1, wherein the antenna unit is configured to communicate with each of the on-vehicle units for performing accounting processing as the predetermined processing.

3. The stationary-station communication system of claim 2, wherein the modem unit is provided with a plurality of modem circuits performing the modulation/demodulation based on the plurality of types of protocols, respectively.

4. An electronic toll collection system comprising:

a plurality of on-vehicle units configured to be mounted on a plurality of vehicles; and a stationary-station communication system performing communication with the on-vehicle units mounted on the vehicles passing thorough a predetermined communication area, each on-vehicle unit operating on one of plurality of types of protocols, the communication being for accounting processing, wherein the stationary-station communication system comprises:

an antenna unit including i) a modem unit configured to selectively perform a plurality of types of modulation/demodulation techniques respectively based on the plurality of types of protocols for the communication with each of the on-vehicle units, and ii) control means configured to allow the modem unit to perform, of the plurality of types of modulation/demodulation techniques, a modulation/demodulation technique based on, of the plurality of types of protocols, a protocol selectively specified by a protocol selection signal so that the antenna unit performs the communication with each of the on-vehicle units based on the specified protocol, when each of the plurality of vehicles is within the communication area, and a protocol controller comprises:

first producing means for producing the protocol selection signal allowing the modem unit to selectively cycle through each of the plurality of types of protocols over a predetermined period of time in at least one slot of the communication such that the communication is performed in turn with the plurality of on-vehicle units, determining means for determining two or more types of protocols adopted by two or more of the on-vehicle units when two or more responses are received from the two or more of the on-vehicle units in response to the protocol selection signal produced by the first producing means, and second producing means for producing the protocol selection signal specifying use of each of the two or more types of determined protocols in one or more time-division slots following the slot in which the determining means determines the two or more types of protocols, until the accounting processing for the two or more on-vehicle units that operates on the determined two or more protocols are completed, respectively, the protocol selection signal produced by the second producing means enabling the control means of the antenna unit to perform the accounting processing.

5. A communication method for electrically collecting a toll, in which accounting processing is performed in communication performed between a plurality of on-vehicle units respectively mounted on a plurality of vehicles and a stationary-station communication system when the vehicles pass through a predetermined communication area, each on-vehicle unit operating on one of a plurality of types of protocols, the stationary-station communication system being provided with a modem unit capable of selectively communicating on a plurality of types of modulation/demodulation techniques respectively using the plurality of types of protocols, when each of the vehicles is within the communication area, the communication method being performed by the stationary-station communication system and comprising steps of:

first producing a protocol selection signal allowing the plurality of types of protocols to be selected in turn over a predetermined period of time in at least one slot of the communication, such that the communication is performed in turn with the plurality of on-vehicle units, determining two or more types of protocols adopted by two or more of the on-vehicle units when two or more responses are received from the two or more of the on-vehicle units in response to the protocol selection signal produced by the first producing step, and second producing the protocol selection signal specifying use of each of the two or more types of determined protocols in one or more time-division slots following the slot in which the determining step determines the two or more types of protocols, until the accounting processing for the two or more on-vehicle units that operates on the determined two or more protocols are completed, respectively, the protocol selection signal produced by the second producing step enabling the accounting processing to be performed.

* * * * *